(12) United States Patent
Zapalac

(10) Patent No.: US 11,219,169 B2
(45) Date of Patent: Jan. 11, 2022

(54) CONVECTIVE TRANSFER OF HEAT FROM AN UNVENTILATED GREENHOUSE TO THE OUTSIDE AIR

(71) Applicant: George Henry Zapalac, Santa Clara, CA (US)

(72) Inventor: George Henry Zapalac, Santa Clara, CA (US)

(73) Assignee: George H. Zapalac, Santa Clara, CA (US)

( * ) Notice: Subject to any disclaimer, the term of this patent is extended or adjusted under 35 U.S.C. 154(b) by 146 days.

(21) Appl. No.: 16/572,603

(22) Filed: Sep. 17, 2019

(65) Prior Publication Data

US 2021/0076576 A1    Mar. 18, 2021

Related U.S. Application Data

(60) Provisional application No. 62/733,086, filed on Sep. 19, 2018.

(51) Int. Cl.
*A01G 9/24* (2006.01)
*A01G 9/14* (2006.01)
*A01G 9/18* (2006.01)

(52) U.S. Cl.
CPC ............ *A01G 9/246* (2013.01); *A01G 9/247* (2013.01); *A01G 9/1438* (2013.01); *A01G 9/18* (2013.01)

(58) Field of Classification Search
CPC ............... A01G 9/24–9/249; A01G 31/02
See application file for complete search history.

(56) References Cited

U.S. PATENT DOCUMENTS

| | | | | |
|---|---|---|---|---|
| 3,669,184 A * | 6/1972 | Franzreb | ................. | F24V 99/00 165/50 |
| 4,567,732 A * | 2/1986 | Landstrom | ............. | A01G 9/246 62/91 |
| 4,869,070 A * | 9/1989 | Assaf | ..................... | A01G 9/246 62/94 |
| 8,915,015 B1 * | 12/2014 | Augspurger | ........... | A01G 9/243 47/17 |
| 2008/0271367 A1 * | 11/2008 | Huhta-Koivisto | ..... | A01G 9/246 47/17 |
| 2009/0158647 A1 * | 6/2009 | Kleinwaechter | ......... | A01G 9/18 47/17 |
| 2010/0126062 A1 * | 5/2010 | Houweling | .............. | A01G 9/14 47/17 |
| 2015/0066215 A1 * | 3/2015 | Buduri | ................... | A01G 9/246 700/276 |
| 2016/0057943 A1 * | 3/2016 | Im | .......................... | A01G 9/245 47/17 |

FOREIGN PATENT DOCUMENTS

EP    1598314 A1 *   11/2005   ............. B01D 3/346

OTHER PUBLICATIONS

Machine translation of EP-1598314-A1 (Year: 2021).*

* cited by examiner

*Primary Examiner* — Timothy D Collins
*Assistant Examiner* — Madeline L Douglas

(57) ABSTRACT

A system is provided to discharge heat from a reservoir of water inside an unventilated greenhouse. Heat is transferred from the greenhouse air to the reservoir during the day by a droplet system. During the cool hours of the night and morning, the same droplet system transfers reservoir heat back into the air within a restricted volume above the reservoir while the air is simultaneously circulated through an air-to-air heat exchanger outside the building.

12 Claims, 5 Drawing Sheets

CONVECTIVE TRANSFER OF HEAT FROM AN UNVENTILATED GREENHOUSE TO THE OUTSIDE AIR

FIELD

Temperature and humidity control system for unventilated greenhouses. Water conservation in agriculture. $CO_2$ sequestration.

BACKGROUND

An unventilated or closed greenhouse may be used to sequester $CO_2$ in decomposition resistant biomass such as humus or woody plant matter by using the $CO_2$ to increase agricultural yield within the greenhouse. Water may also be recycled within a closed greenhouse, allowing deployment of the greenhouse in regions where arable land and fresh water are scarce.

The most challenging problem of operating a closed greenhouse is to remove heat during the day while preventing the relative humidity from rising to a level that is too high for the plants. In US-20080271367-A1 due to Huhta-Koivisto et al, the air of a closed greenhouse is cooled by dispensing cool falling droplets that remove both sensible and latent heat from the air. However the water is cooled by evaporation and water is thereby lost to the outside air. One embodiment of the invention circulates the water in a water-to-water heat exchanger, and one might evaporate seawater rather than freshwater on the other side of the heat exchanger, although this solution would generally restrict the greenhouse to be on the coast. One might also cool the reservoir of water within the greenhouse by using a chiller, but this solution is energetically expensive.

In EP 0 517 432 A1 due to Assaf, a large reservoir of water disposed outside of the greenhouse is cooled by circulating the water at night through a water-to-air heat exchanger, where cool ambient air is used on the other side of the heat exchanger so that heat is discharged from the reservoir to the ambient air. This invention uses the stratification of temperature within the reservoir, wherein the warmest water near the surface of the water is circulated to the heat exchanger. Although the reservoir is shown as open to the outside air, the evaporation is reduced because the water is not agitated or dispersed as droplets. However circulating water to the heat exchanger has disadvantages compared to an air-to-air heat exchanger: water is heavy, so the heat exchanger tubes would require significant support not otherwise necessary for an air-to-air heat exchanger, and there are likely many connections, so that extra expense would be required during the construction of the heat exchanger to avoid leaks.

A droplet system may be used during the day to control the temperature and humidity of the air in a closed greenhouse, with the heat accumulated in a large reservoir of water within the greenhouse during the day rather than concurrently cooling the water by evaporation or by using a chiller. This invention addresses the problem of discharging the accumulated heat in the reservoir by using the same droplet system coupled to an air-to-air heat exchanger, so that forced convection of saturated greenhouse air transfers the reservoir heat to the cool ambient air of the late night and morning.

SUMMARY

An unventilated greenhouse provided with a continuous source of $CO_2$ is cooled by transferring solar energy entering the greenhouse during the day into large reservoirs of water located inside the greenhouse. The accumulated reservoir heat is discharged to the outside air during the late night and morning when the outside temperature is coolest by circulating the greenhouse air through banks of thin-walled tubes located outside of the greenhouse building that serve as heat exchangers. Heat and water vapor are transferred between the greenhouse air and reservoirs by circulating reservoir water through a droplet dispenser deployed above the reservoirs. The reservoirs, droplet dispensers, and the entrance and exit ports to the heat exchanger system in the walls of the greenhouse are surrounded by a restricted volume or "tunnel" that may optionally be closed to effectively isolate the volume of air above the reservoirs and within the heat exchangers from the air in the remainder of the greenhouse volume.

During the day the heat exchanger ports are closed while wall sections along the sides of the tunnels are pivoted or slid to allow air to exchange freely between the tunnels and the remainder of the greenhouse volume. The droplet dispenser above the reservoirs is activated to transfer heat and water vapor from the greenhouse air to the cool droplets and into the reservoir, gradually warming the reservoir water during the day. During the late night and morning hours the heat exchanger ports are opened and the tunnels are closed off from the remainder of the greenhouse volume, creating a restricted volume of air above the reservoirs and within the heat exchangers. The droplets are activated above the reservoirs and saturated air is circulated through the tunnels and heat exchangers to transfer heat from the tunnel air into the cool ambient air flowing past the heat exchanger tubes, cooling the tunnel air above the reservoirs. The warm reservoir droplets transfer heat and water vapor to the cool tunnel air, cooling the reservoir water so that the reservoirs can store the solar energy entering the greenhouse during the following day.

With the exception of unintended infiltration the air never leaves the greenhouse system so that all of the water is recycled. $CO_2$ emitted from the decomposition of biomass into humus within the greenhouse is also recycled. Hence this cooling system is most suitable for enabling agriculture in higher elevation deserts or higher latitude deserts where fresh water is scarce and the temperature is cool (<16° C.) in the early morning.

The energy requirement to maintain the greenhouse temperature and humidity during a 24-hour cycle is reduced by using the ambient night and morning temperature to cool the greenhouse. This allows the option of providing all of the required energy for the greenhouse cooling system with photovoltaics and battery storage. The solar modules may be deployed on the roof of the greenhouse over the reservoirs so that the reservoirs are shaded, preventing unneeded solar radiation from entering the greenhouse.

DETAILED DESCRIPTION

Figure 1:
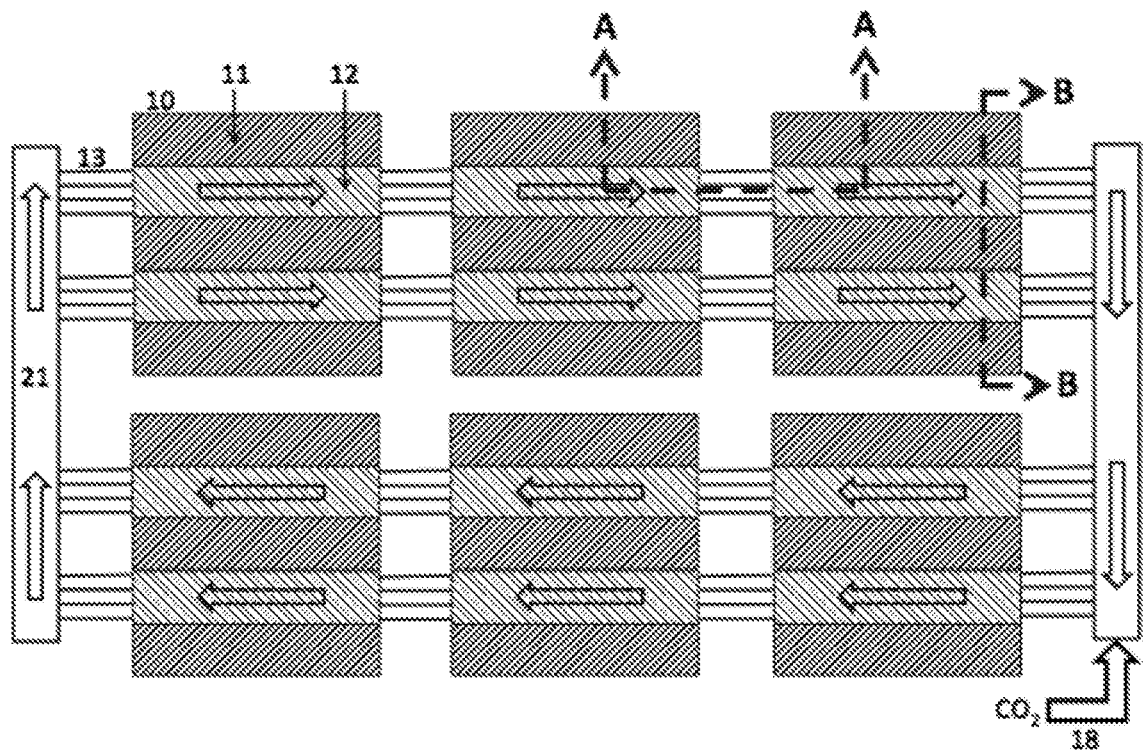
FIG. 1: Plan schematic of a small greenhouse array with 6 greenhouse buildings connected to each other by heat exchangers, showing cultivated regions and reservoirs. Arrows indicate the direction of airflow within the buildings and heat exchangers when heat is discharged from the reservoirs.

A plan schematic of a small greenhouse array is shown in FIG. 1. Six greenhouse buildings (10) are connected by bundles of tubes serving as heat exchangers (13) to form an unventilated or closed system. Each greenhouse contains alternate regions or lanes of water reservoirs (12) enclosed beneath tunnels (14, shown in FIG. 2) and cultivated lanes containing soil and plants (11). The tunnels over the reservoirs may optionally be opened to exchange tunnel air with air from the greater greenhouse volume outside of the tunnels.

The reservoirs store the heat entering the greenhouse from solar radiation during the day. During this period the entry and exit ports to the heat exchangers are closed and the tunnels are open to circulate air between the tunnel volumes and the greater greenhouse volume. Heat is transferred from the air to the reservoir by pumping reservoir water above the reservoir into trays or a network of conduit under the roof of the tunnel and allowing the water to fall back by gravity or to be sprayed into the reservoir as small droplets that exchange both latent and sensible heat with the surrounding air. By the end of the day the reservoir water has warmed several degrees; this heat has to be discharged to the outside air during the night and morning so that the reservoir water is sufficiently cool to absorb the solar heat during the following day.

The greenhouse air is cooled or dehumidified at night and during the morning by circulating the air from greenhouse to greenhouse through the heat exchangers. During this period the air within the tunnels above the reservoirs may be circulated through the heat exchangers between the greenhouses as shown by the arrows. The tunnels are closed off from the greater greenhouse volume and the entry and exit ports to the heat exchangers at each end of the tunnels are open. Turnaround sections (21) allow air from a first greenhouse to eventually be returned to the first greenhouse. The turnaround sections may be replaced by additional greenhouses suitably oriented to achieve the same purpose. $CO_2$ (18) is introduced at one or more locations in the greenhouse array to replenish the $CO_2$ consumed by the plants.

Figure 2:
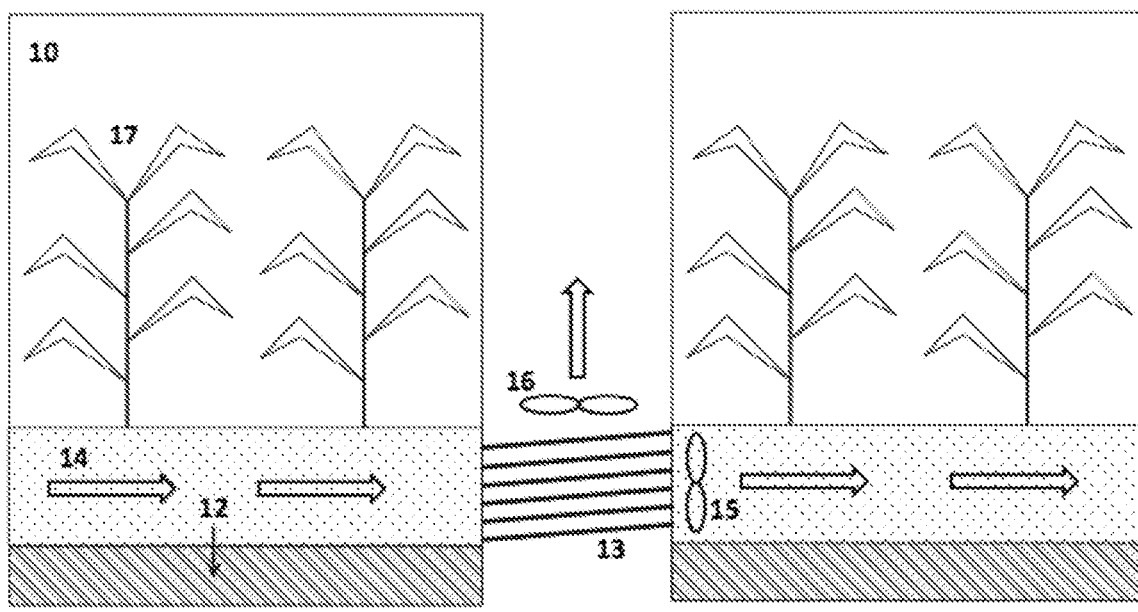
FIG. 2: Elevation schematic of 2 greenhouse buildings parallel to the direction of airflow from Section A-A shown in FIG. 1.

An elevation schematic for two greenhouse buildings (10) is shown in FIG. 2 from a plane parallel to the airflow from Section A-A in FIG. 1; the plane passes through the reservoirs (12) and tunnels (14). Plants (17) are shown from an adjacent cultivated lane behind the reservoir and tunnel. When heat is discharged from the reservoirs during the night and morning the airflow within the tunnels is shown by the arrows in FIG. 2, or by the arrows in FIG. 1. During this period the sides of the tunnels are closed to prevent or minimize the exchange of air between the tunnel volume and the greater greenhouse volume so that the tunnels and heat exchangers form a separate closed volume within the greenhouse array. The air in the tunnel flows past small droplets of reservoir water that are dispensed from the underside of the roof of the tunnel; the droplets are indicated by the dot pattern within the tunnel volume (14). These droplets transfer heat and water vapor from the reservoir (12) to the tunnel air, saturating the tunnel air. When the air passes through the heat exchanger (13) this heat is transferred to the outside air, thereby cooling the reservoir water. The heat exchanger tubes (13) are slightly angled so that water condensing in the tubes flows back to the reservoir in the previous greenhouse. Fans (15) deployed within the tunnel of the next greenhouse, near the outlet port of the heat exchanger tubes, pull air from the previous greenhouse through the heat exchanger tubes and into the tunnel of next greenhouse. Fans (16) deployed outside, above the heat exchanger tubes, pull air in a cross flow past the heat exchanger tubes to further facilitate the transfer of heat to the outside air.

Figure 3:
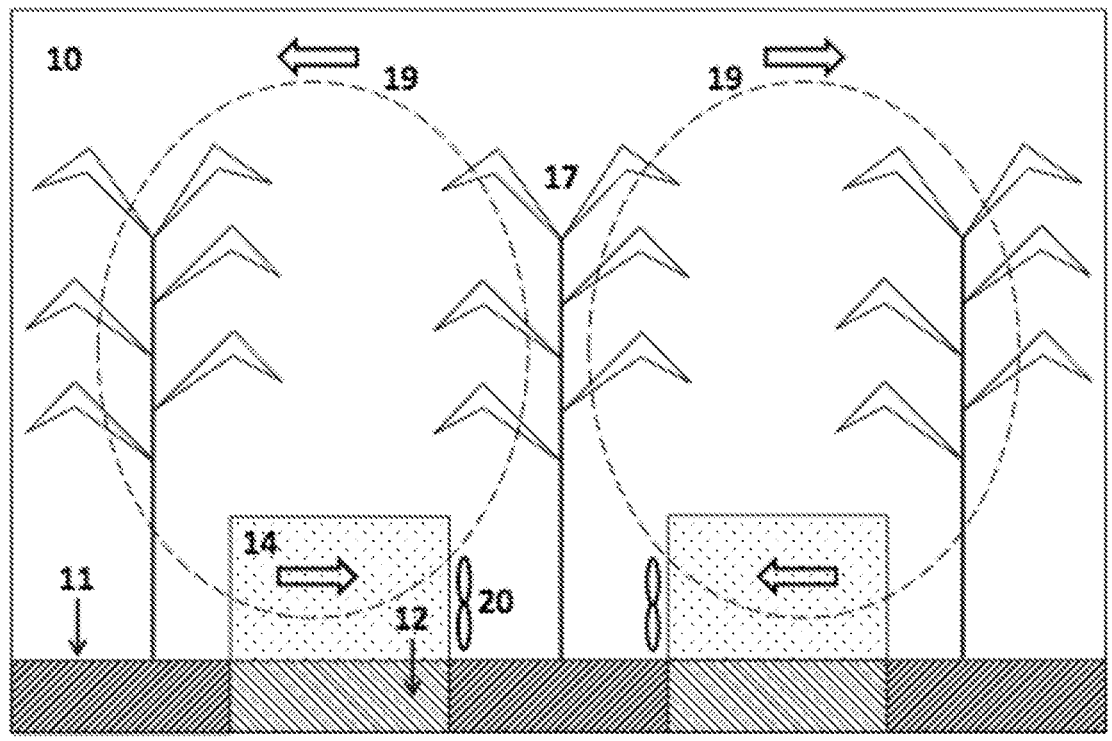
FIG. 3: Elevation schematic of a single greenhouse building normal to the direction of airflow from Section B-B shown in FIG. 1.

An elevation schematic of a single greenhouse building (10) is shown in FIG. 3 from a plane normal to the airflow from Section B-B in FIG. 1. FIG. 3 illustrates the operation of the greenhouse during the day. During this period the tunnels (14) are closed off from the heat exchanger inlet and outlet ports and the sides of the tunnels are open to allow tunnel air to be exchanged with greenhouse air. Fans (20) circulate the air underneath and across the tunnels and through the plants (17) grown in the cultivated regions (11), as shown by the airflow circulation patterns (19) indicated by the dashed circles and arrows. Droplets within the tunnel (14) transfer heat and water vapor from the warm greenhouse air to the cooler reservoir water (12).

Figure 4:
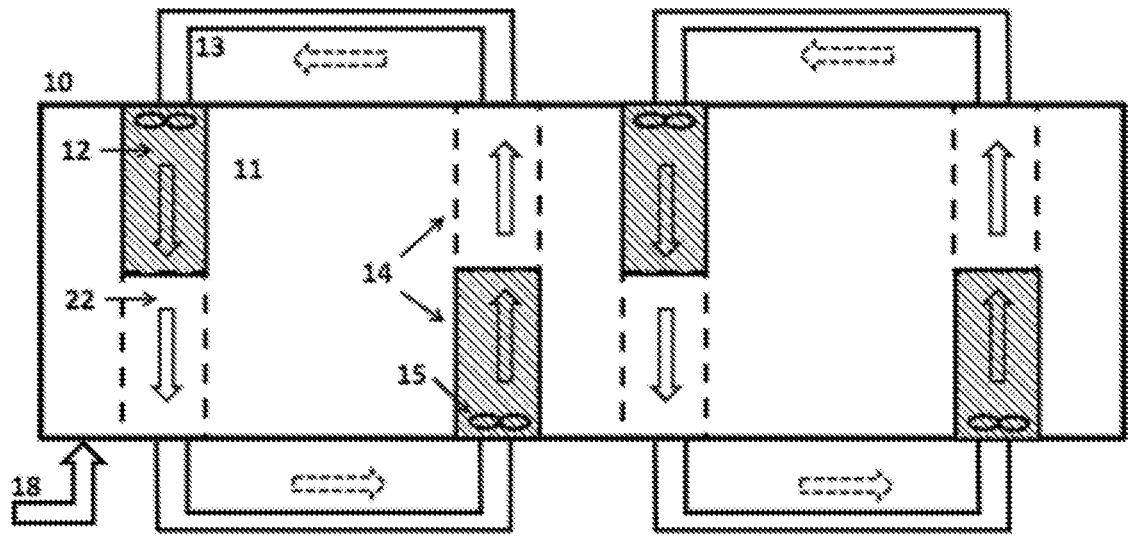
FIG. 4: Plan schematic of a single greenhouse building where heat exchangers return the air to the same building showing an exemplary pattern of airflow that may be repeated to extend the greenhouse indefinitely in the horizontal direction.

FIG. 4 shows a plan schematic of a different embodiment of the same invention using a single greenhouse building (10), where the heat exchangers return the air to the same building. In this figure the patterned regions are the reservoirs (12). A tunnel region (14) includes both the reservoir and a conduit (22) leading to the reservoir that is indicated by the dashed lines. This conduit may have a low height and correspondingly small cross section to allow extending the cultivated region (11) between the reservoirs into the area above the conduit. Air is pulled through the tunnels using the fans (15). The modular pattern of airflow in FIG. 4 allows extending the greenhouse building indefinitely in the horizontal direction. $CO_2$ is introduced at one or more locations (18) to fertilize the plants.

Figure 5:
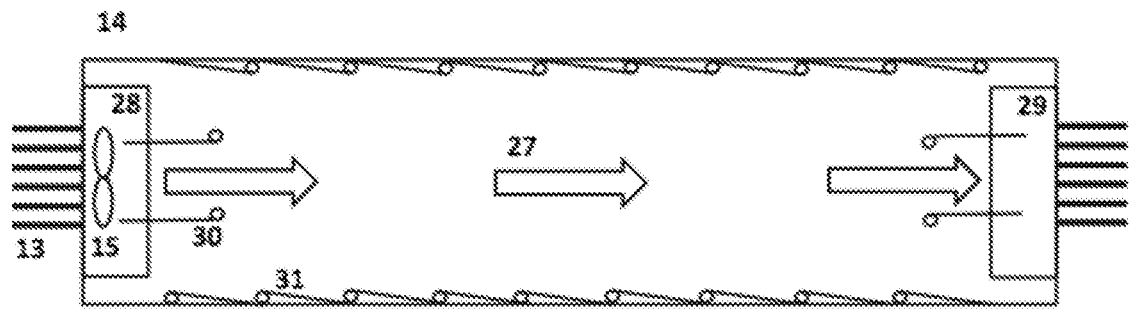
FIG. 5: Plan schematic of the tunnel during night operation when the tunnel air is circulated through the tunnel and heat exchanger, but isolated from the remainder of the greenhouse air.

A plan view schematic of one embodiment of the tunnel (14) is shown in FIG. 5 while the reservoirs are being cooled. The tunnel walls are comprised of pivotally moveable louvers (31) that are closed to prevent cool, high humidity air within the tunnel from mixing with the warmer greenhouse air. There are also pivotally moveable louvers (30) covering the outlet port (28) and inlet port (29) of the heat exchanger tubes; these louvers are open to allow circulation of the tunnel air through the heat exchangers (13), driven by the fan (15) deployed at the outlet port of the heat exchanger. The fan creates an airflow (27) through the tunnel of air that has been cooled by the heat exchangers. During this period the reservoir droplet dispensers are activated to allow warm reservoir droplets to transfer heat into the cool saturated air above the reservoir.

Figure 6:
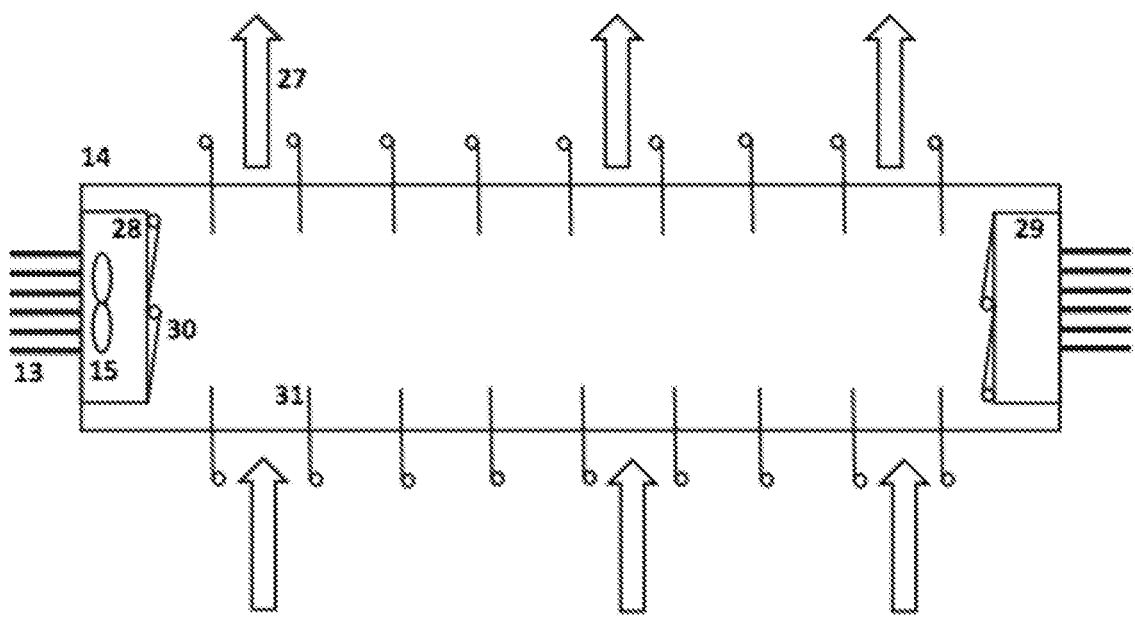
FIG. 6: Plan schematic of the tunnel during day operation when the heat exchanger ports are closed, but the sides of the tunnel are opened to exchange air freely with the remainder of the greenhouse air.

A second plan view schematic for this embodiment of the tunnel is shown in FIG. 6 during daytime operation of the greenhouse. During daytime operation the louvers (30) covering the outlet (28) and inlet (29) ports to the heat exchangers are closed, blocking the circulation of air through heat exchangers (13), and fan (15) is powered off. The louvers (31) on the sides of the tunnel are open, allowing the flow (27) of greenhouse air across the tunnel. During this period the reservoir droplet dispensers are activated to allow cool reservoir droplets to absorb heat from the warm air throughout the volume of the greenhouse.

Water drawn from the reservoirs to irrigate the plants is returned to the greenhouse air through evaporation from the surface of the soil or transpiration from the plants. Water that transpires from the plants or evaporates from the droplets or soil will eventually be returned to the reservoirs by condensation onto the droplets falling into the reservoirs or by condensation on the inner surfaces of the heat exchanger tubes.

The droplet size must be large enough to allow easily returning the droplets to the reservoirs. Depending upon the geometry of the reservoir and dispensing system, the droplets from a very fine mist or fog may have a diameter that is too small for this application. With this caveat in mind, smaller droplets in general are much better than larger droplets for heat transfer. Ideally the droplets have a diameter of less than 1 mm.

Figure 7:
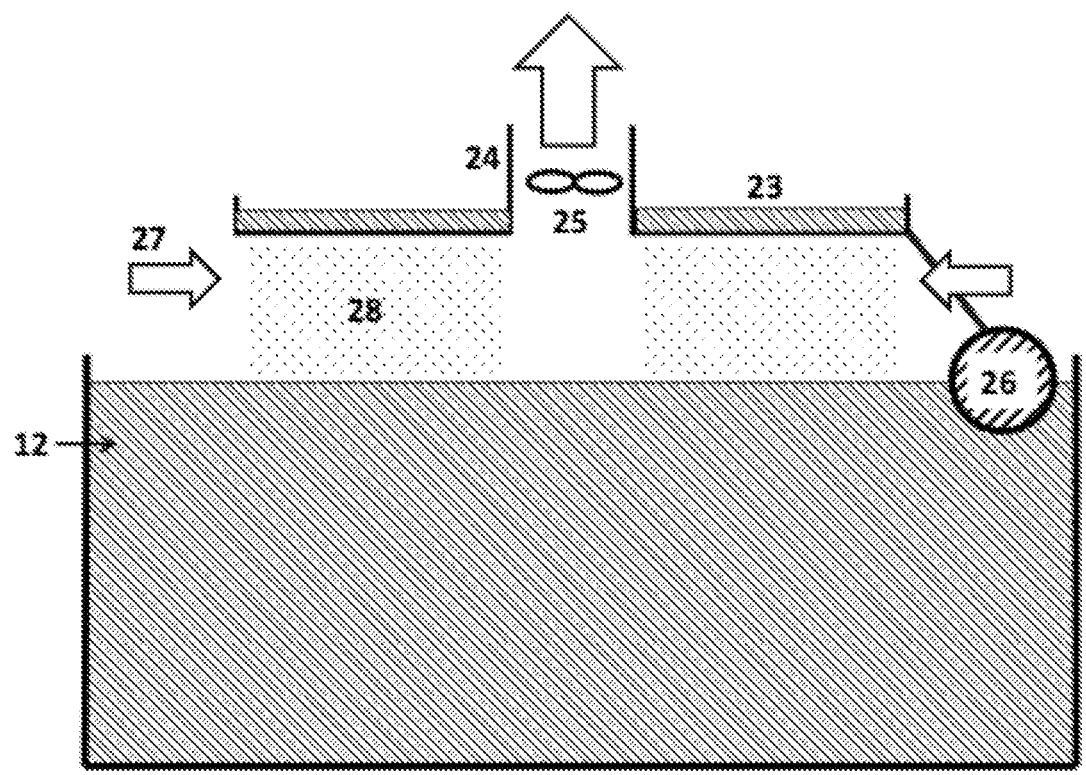
FIG. 7: Elevation schematic of a droplet dispenser where the droplet flow is concentrated within a small area to reduce the greenhouse floor space covered by reservoirs.
Figure 8:
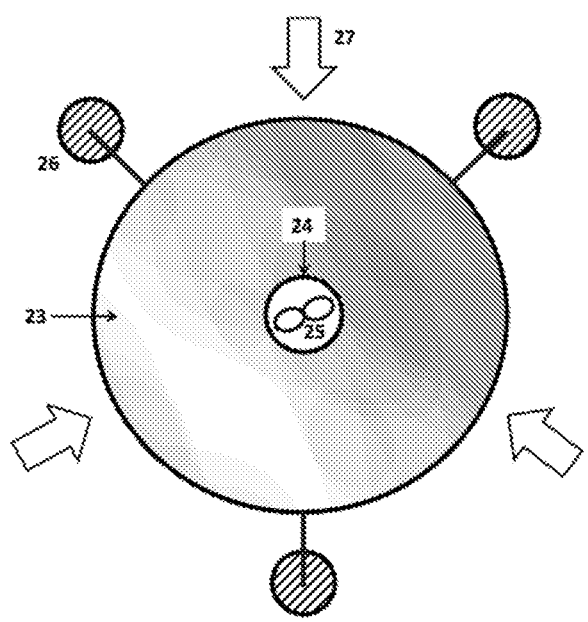
FIG. 8: Plan schematic of the dispenser shown in FIG. 7.

For some embodiments it may be preferable to reduce the floor space occupied by the reservoirs. One such embodiment uses a tall cistern for a reservoir with suitable conduit to provide a tunnel that accommodates the geometry of a tall cylindrical structure. FIGS. 7 and 8 show the elevation and plan schematics for a droplet dispenser that could be deployed using floats on the surface of the reservoir (12). Water is pumped from the reservoir into an annular tray (23) above the reservoir. One embodiment of the tray has a raster of openings on the underside for dispensing the droplets by gravity. These openings might be a dense raster of 2 mm long, 0.5 mm diameter polyimide tubes that have been glued into holes drilled in the bottom of the tray, allowing 1 mm droplets to fall by gravity. Alternatively the region occupied by the tray might be replaced by plumbing with nozzles to spray the droplets under pressure in order to further reduce the size of the droplets. Either structure could be constructed robotically. The tray has an open region in the center free of droplets with an open cylindrical enclosure (24) to accommodate a fan (25) that pulls air past the droplets (28) (the dotted pattern beneath the tray) in the pattern of airflow (27) shown by the arrows. The droplet dispenser might further include floats (26) that would allow the dispenser to be supported on the surface of the reservoir without the need for a frame to support the dispenser from the ground.

Additional embodiments of this invention may cool other structures besides greenhouses or may use other lighting schemes for the plants. In an alternative embodiment artificial lighting using efficient red and blue LEDs instead of sunlight may reduce the load on the cooling system. In another embodiment wide band gap photovoltaic modules with transparent front and back contacts such as thin film perovskite solar cells may be deployed on the roof of the greenhouse and use the blue part of the spectrum to generate energy for powering the cooling system while transmitting the red part of the spectrum to the plants. The use of soilless cultivation schemes such as hydroponic or aeroponic cultivation are additional embodiments of the same invention.

The remainder of this discussion describes in much greater detail a theoretical model of a specific embodiment of this invention that is operated to cultivate sugarcane. The model and its computer simulation illustrate the heat and mass transport principles behind the operation of the cooling system as well as a recipe for operating the greenhouse cooling system over a 24-hour cycle during the hottest days of the summer. We will use a coordinate system with $\hat{x}$ in the direction of the airflow shown for the top row of greenhouses in FIG. 1, $\hat{y}$ in the direction of the greenhouse roof (directed out of the page in FIG. 1), and $\hat{z}$ directed downwards in FIG. 1.

Each greenhouse building in the model has a width W=50 m that extends along the $\hat{x}$ direction, a length that may be extended indefinitely along $\hat{z}$, and a total height $h_G$ of 10 m. The greenhouse height includes $d_r$=1.2 m of either reservoir or soil depth and 8.8 m of air volume; reservoirs occupy half the greenhouse floor space so that 2 ha of enclosed area provides 1 ha of cultivated area. The reservoirs and cultivated regions are disposed as 5 m wide lanes that extend along $\hat{x}$. The reservoir lanes are enclosed in tunnels that enclose a rectangular volume with a height h=2 m above the reservoirs for the droplet cooling system. As previously described, the sides of the tunnels are optionally opened during the day to the air in the greater greenhouse volume.

The greenhouse buildings are separated along $\hat{x}$ by a distance L=15 m but connected to one another in this region by heat exchanger tube banks that connect the tunnel volumes of adjacent greenhouses: each reservoir tunnel begins or ends in a heat exchanger bank of 1500 PVC tubes with an inner diameter $D_0$=4.8 cm and an outer diameter $D_1$=5.0 cm. The tubes have a pitch of a=2 along $\hat{z}$ and a pitch of b=1.25 along $\hat{y}$: the distance between the centers of the tubes within a row along $\hat{z}$ is $aD_1$ and the distance between tube rows along $\hat{y}$ is $bD_1$. There are 30 layers of tubes so that the height of the tube bank is 186.3 cm. The tube bank may be arranged in an inline or staggered configuration and angled slightly to allow condensed water to drain into the reservoir from the preceding greenhouse as shown in FIG. 2.

Although PVC has a low thermal conductivity ($k_{01}$=0.0019 W cm$^{-1}$ °C.$^{-1}$, 1000 times less than aluminum), the heat transfer is dominated by the conductivity through the air on either side of the 1 mm tube wall so that the conductivity through the tube wall only reduces the total heat transfer coefficient by 10%.

The simulation begins with nighttime operation at 7 pm when the reservoir tunnels are vented to the remainder of the greenhouse volume and the heat exchanger entry and exit ports are closed. Between 7 pm and 9 pm the greenhouse cooling system is idle and the temperature gradually decreases while the relative humidity rises as heat is conducted through the walls and roof. To control the nighttime increase in relative humidity, 10% or the reservoir lanes—denoted as the R2 lanes or reservoirs—are devoted to dehumidifying the air at night and during the morning. The R2 lanes have optionally empty reservoirs and no droplet system plumbing and the tunnels are always open to the greenhouse volume. Hence they cannot be used to cool the air during the day and part of these lanes may even be cultivated. Between 9 pm and 10 am the ports to the heat exchangers on the R2 lanes are opened and greenhouse air is pulled through the heat exchangers to dehumidify the air.

During this period the airflow in the R2 heat exchanger tubes is maintained at a constant velocity of 6 m s$^{-1}$.

The remaining 90% of the reservoir lanes, denoted as R1 lanes, contain fully operational reservoirs and droplet systems. Between 1 am and 9:30 am these lanes are discharging reservoir heat to the cool outside air. The tunnels are closed off from the greenhouse and the droplet system is activated at a constant flow rate of 300 cm$^3$ s$^{-1}$ of droplets per m$^2$ of reservoir area. Fans pull air through the heat exchanger tubes at the variable rate of $v_x=0.58(T_r-T_o)$ m s$^{-1}$ where $T_r$ is the reservoir temperature and $T_o$ is the outdoor temperature (° C.). The maximum air velocity in the heat exchanger tubes for the R1 reservoirs is 5.98 m s$^{-1}$ at 6:35 am.

Between 9:30 am and 7 pm the greenhouses are running in daytime operation: the vents to the R1 tunnels are opened, the heat exchanger ports are closed, and the droplet system is operated at a constant flow rate of 100 cm$^3$ s$^{-1}$ per m$^2$ of reservoir area to transfer incoming solar heat to the reservoirs. During this period fans pull greenhouse air across the open tunnels at 2.5 m s$^{-1}$ to continuously cool the greenhouse air.

Figure 9:
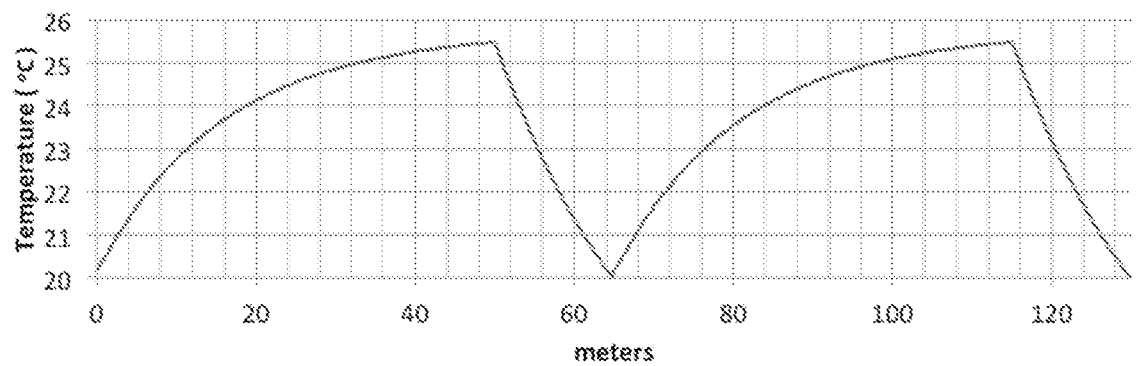
FIG. 9: Simulation of the air temperature versus position parallel to the airflow within the greenhouse tunnels and heat exchangers at 7 am during the discharge of heat from the reservoirs.

FIG. 9, calculated from the simulation of the model, shows the temperature of the saturated greenhouse air versus position within the tunnels and heat exchangers at 7 am while heat is being discharged from the reservoirs in the R1 lanes. The temperature rises in the tunnels as the warm reservoir droplets heat the air, and then falls more rapidly in the heat exchanger tubes as this heat is transferred to the outside air.

Figure 10:
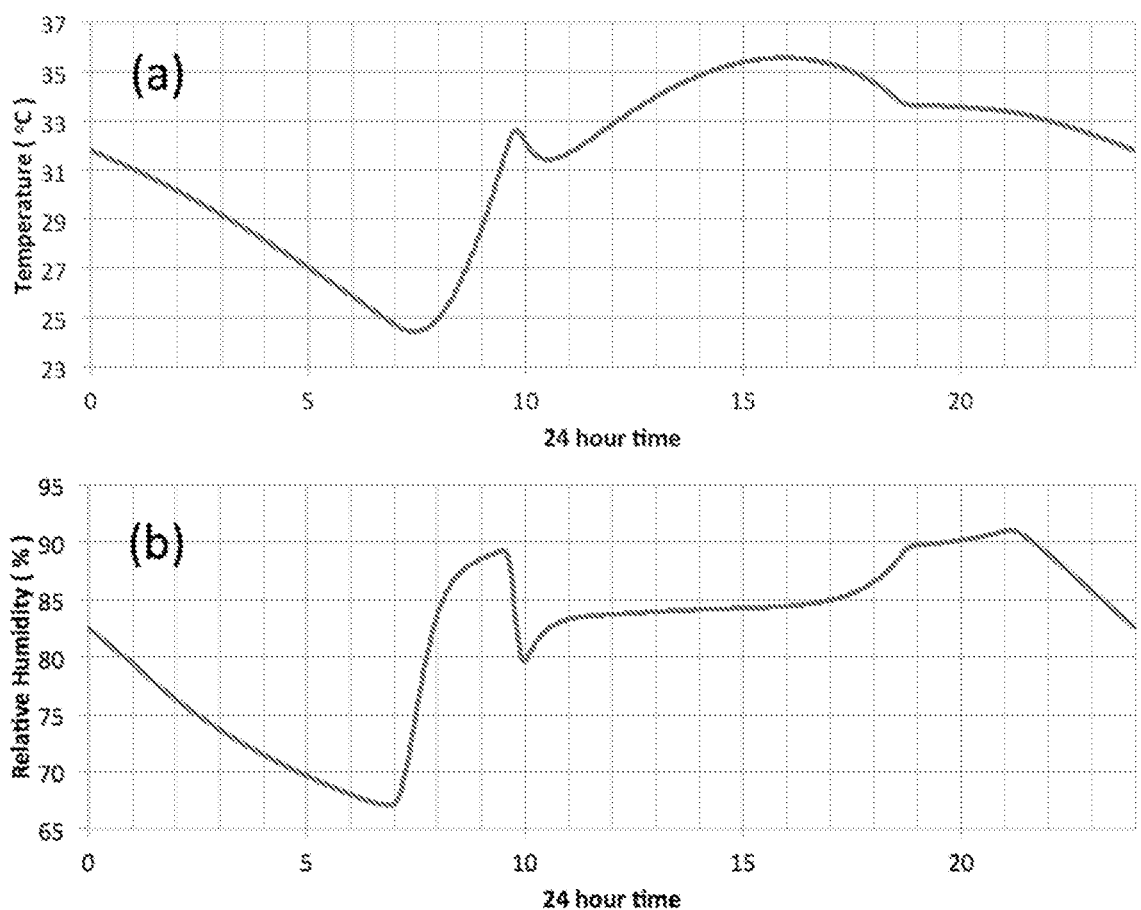
FIG. 10: Simulation of the temperature (a) and humidity (b) within a greenhouse during a 24-hour cycle for growing sugarcane in a desert climate with a minimum outside temperature of 16° C.

FIG. 10 shows the temperature (10a) and relative humidity (10b) for the greenhouse model during a 24-hour cycle provided by the simulation of the cooling system. It is worth reviewing these two plots in detail to gain an understanding of how the greenhouse cooling system recipe maintains the temperature and relative humidity within an acceptable range for sugarcane. In the simulation the sun rises at 7 am and sets at 7 pm. Beginning at 7 pm the cooling system is idle and the greenhouse temperature slowly falls as heat is lost by conduction through the walls and roof. The relative humidity rises during this period due to the fall in temperature. At 9 pm the fans are activated for the R2 heat exchangers to dehumidify the air. The temperature decreases more rapidly because the heat exchangers provide additional cooling, and the humidity decreases due to condensation in the heat exchangers. At 1 pm the droplets are activated to cool the R1 reservoirs, but the tunnels over the R1 lanes are closed to the greater greenhouse volume so that the temperature and humidity of the greenhouse are not affected by the droplets and saturated air within the tunnels and heat exchangers; the temperature and humidity continue to drop for the greater greenhouse volume. The efficacy of the R2 heat exchangers drops as the relative humidity decreases so that there is almost no water vapor removal by the R2 lanes at 7 am. At 7 am the sun rises and the plants begin to transpire. The transpiration increases with increasing sunlight and immediately exceeds the removal of moisture by the R2 heat exchangers so that the humidity rises. Between 7 am and 8 am the temperature of the greenhouse is nearly constant so that the humidity rises rapidly with increasing plant transpiration. After 8 am the temperature of the air increases rapidly so that the rate of rise of the humidity slows. At 9:30 am the tunnels are opened and the heat exchanger ports are closed. The droplet system ramps to full flow between 9:30 am and 10 am; the cooling system is now in daytime operation and the reservoirs are cold. The temperature drops, and as water condenses on the droplets the humidity falls until 10 am when the R2 lanes are turned off.

After 10 am the increase in humidity from the plant transpiration exceeds the condensation on the droplets and the humidity now rises. However as the air temperature rises with increasing insolation the humidity rises more slowly until 4 pm. The gradually increasing humidity during this period reflects the balance between condensation on the droplets, increasing temperature, and transpiration from the plants. At 4 pm the temperature begins to decrease due to the decreasing insolation into the greenhouse; this causes the humidity to increase more rapidly. Between 6:30 pm and 7:00 pm the droplets ramp to zero flow, the temperature stops decreasing, the plants stop transpiring due to the lack of sunlight, and the humidity stops increasing until the temperature begins to fall due to the conduction of heat out of the greenhouse. This completes the 24 hour cycle.

Sugarcane plants are grown on the cultivated regions in the model at a very high density of 5 plants m$^{-2}$. Each plant has an average green mass of 6 kg so that the biomass density is 300 tonnes ha$^{-1}$ of cultivated area. The optimal average daily temperature for sugarcane has a range that extends to 35° C. so that sugarcane is an ideal candidate for the greenhouse system. A second notable candidate is corn with an optimal average daily temperature that extends to 33° C.

The transpiration E of sugarcane grown at high density within the greenhouse significantly affects the greenhouse climate and therefore the requirements of the cooling system. It is given by the relation[1] E=gVPD where g is the leaf conductance and VPD is the vapor pressure deficit:

$$VPD = \left(\frac{P_w}{P_{a1}}\right)\left(1 - \frac{RH}{100}\right) \quad (1)$$

$P_w$ is the saturation vapor pressure, $P_{a1}$ is one atmosphere, and RH is the relative humidity. The biological properties of greatest relevance to the greenhouse cooling system are contained in the model of the leaf conductance g. The conductance g combines the stomatal conductance $g_S$, the cuticle conductance $g_C$ for leaf regions outside the stomata, and the boundary layer conductance $g_{BL}$ that accounts for the air velocity next to the leaves.[1] In general $g_S \gg g_C$ and the air is circulated through the plants at 2 m s$^{-1}$ in the model so that $g_{BL}$ may be neglected,[1] hence $g \approx g_S$. The stomatal conductance $g_S$ depends upon both light intensity and $CO_2$ concentration; for sugarcane $g_S$ reaches a maximum of 0.85 mol m$^{-2}$ s$^{-1}$ in the afternoon,[1] where these units refer to moles of air per leaf area. If the $CO_2$ concentration is held fixed within the greenhouse and the average leaf area is 600 cm$^2$ per plant,[2] then $g_S$ is modeled as proportional to the insolation, reaching a maximum of 0.51 mol s$^{-1}$ per plant at 1 pm in the afternoon for $CO_2$ at the ambient concentration. In the simulation the $CO_2$ concentration is assumed to be double the ambient concentration; this reduces the stomatal conductance and transpiration by 28%.[3]

When the heat $\Delta Q$ is introduced into a partial volume or voxel $V_a$ of greenhouse air, the increase in air temperature $\Delta T_a$ is modeled by the mass and specific heat capacity of the air, plants, and top layer of soil contained within $V_a$:

$$\Delta Q = (V_a \rho_a C_{pa} + m_p C_{pp} + m_s C_{ps})\Delta T_a \quad (2)$$

In Eq. (2) $\rho_a$ is the density of air, $C_{pa}$ is the specific heat capacity of air, $m_p$ is the mass of the plants within $V_a$, $C_{pp}$ is the specific heat capacity of the plants, m is the mass of the top 10 cm a pp s of soil, and $C_{ps}$ is the specific heat capacity of the soil. The volume $V=2A_1h_a$ of the representative greenhouse voxel used for the simulation includes $A_1=1$ m² of cultivated area, $A_1=1$ m² of reservoir area, and the average height $h_a$ of the air column within the greenhouse over the cultivated area and tunnels if the tunnels are closed (7.8 m), or the full height of the air column if the tunnels are open to the greenhouse air (8.8 m). The heat transfer through the surface of the reservoirs is neglected compared to the heat transfer to the reservoirs from the droplet system. The model assigns $m_p=30$ kg, $C_p=1.24$ J K⁻¹ g⁻¹, $m_s=190$ kg, and $C_{ps}=0.92$ J K⁻¹ g⁻¹.

Heat that enters the greenhouse by insolation or by net conduction through the walls and roof must be removed by the heat exchangers. Because the heat is only removed from the greenhouse during the night and morning, the incoming heat during the day must be stored in the reservoirs and to a lesser extent in the mass of the soil and plants in order to control the air temperature inside the greenhouse.

During the day the solar insolation above the greenhouse is 8.0 kWh m⁻² or 28.8 MJ m⁻². Opaque panels deployed on the roof above the reservoir lanes shade 37.5% of the greenhouse and reduce the insolation that enters the greenhouse to 18.0 MJ m⁻² while still allowing the full light intensity to reach the plants. If 55% of these panels are solar panels with an efficiency of 20% and coupled to battery storage, then it will be shown below that the solar panels will generate enough electricity to operate the greenhouse cooling system. The average insolation versus time that enters the greenhouse is modeled as the half cosine curve $dQ_s/dt = I_0 \cos[\pi(t-13)/12]$ between sunrise at 7 am and sunset at 7 pm, where t is the time in hours for a 24-hour clock and $I_0=654$ W m⁻².

The most critical parameter for operating the greenhouse cooling system is the minimum outside temperature during a 24-hour period. In the model the minimum temperature is 16° C. at 7 am and the maximum temperature is 38° C. at 3 pm. Between 6:08 am and 3:52 pm the temperature follows a cosine curve; at all other times the temperature decreases linearly from the afternoon until the morning. The temperature difference $\Delta T$ between the greenhouse air and outside air transfers heat by conduction through the walls and roof at the rate $Q_C=UA\Delta T$ where A is the total area of the walls and roof with $U=1.4$ W ° C.⁻¹ m⁻².

During the day the heat exchanger ports are blocked and the reservoir tunnels are vented allowing the greenhouse air to be circulated by fans between the tunnel airspace and the greater greenhouse volume. The simulation calculates the heat and mass transfer during a small time step $\Delta t$ (typically 1.5 minutes) into the representative voxel $V_a$ of greenhouse air.

During $\Delta t$ solar insolation transfers the heat $\Delta Q_S$ into the greenhouse and the additional heat $\Delta Q_C$ is transferred into the greenhouse by conduction through the walls and roof. The reservoir droplet dispensing system is activated to provide cool water droplets pumped from the reservoir to transfer the incoming heat into the reservoir or into the air as latent heat. The simulation uses the relations for the heat and mass transfer from a falling droplet, described in detail near the end of this section, to calculate the signed quantities for the total heat $\Delta Q_r$ and mass $\Delta M_r$ transferred to the falling droplets—and therefore to the reservoir—within a representative voxel during $\Delta t$. When $\Delta M_r<0$ latent heat is transferred from the droplets to the air increasing the humidity. The humidity is also increased by the transpiration $\Delta M_{Tr}>0$ from the plants. Generally $\Delta M_r>0$ during the day so that the droplet system dehumidifies the air, counteracting the transpiration from the plants.

The change in humidity is calculated from the mixing fraction $X_a$: the grams of water per gram of dry air. The mixing fraction $X_a$, the greenhouse temperature $T_a$, and the reservoir temperature $T_r$ each change during $\Delta t$ by the amounts:

$$\Delta X_a = \frac{\Delta M_{Tr} - \Delta M_r}{V_a \rho_a} \quad (3)$$

$$\Delta T_a = \frac{[\Delta Q_S + \Delta Q_C - H_v(\Delta M_{Tr} - \Delta M_r) - \Delta Q_r]}{(V_a \rho_a C_{pa} + m_p C_{pp} + m_s C_{ps})}$$

$$\Delta T_r = \frac{\Delta Q_r}{A_1 d_r \rho_w C_{pw}}$$

In these expressions we have introduced the additional parameters $\rho_w$ and $C_{pw}$ for the density and specific heat capacity of water, and $H_v$ for the heat of vaporization of water.

When the reservoirs are discharged at night and during the morning the tunnels are not vented and the heat exchanger ports are open so that the air volume in the tunnels and heat exchanger tubes forms a separate system from the remainder of the greenhouse volume. The simulation follows a small tunnel voxel of air moving through the tunnel and additionally a much smaller tube voxel of air moving through a single heat exchanger tube to calculate the heat and mass transfer at each position x along the tunnel-tube volume. The air velocities $v_T$ through the tunnel and $v_x$ through the tubes are related by the relative cross sectional areas of the tunnel and tubes: $v_x = 3.684 v_T$.

Within the tunnel volume over the reservoir surface the simulation follows a lamina of moving air or tunnel voxel with volume $V_T = h\Delta W \Delta Z_1$ and velocity $v_T$ from the beginning of the tunnel at the exit of the previous heat exchanger until the end of the tunnel at the entrance of the next heat exchanger. The quantity $h=2$ m is the height of the tunnel air space above the reservoir surface through which the droplets fall, $\Delta Z_1=1$ m is a unit width for a "1 m lane" of reservoir surface, and $\Delta W=5$ cm is the length of the tunnel voxel in the direction of airflow. Cool saturated air enters the beginning of the tunnel and the droplet flow rate is set sufficiently high so that the air at the end of the tunnel is at or near the reservoir temperature and is saturated or nearly saturated.

The time step for the tunnel simulation has the duration $dt = \Delta W / V_T$ where $dt \ll \Delta t$. During each time step warm water droplets pumped from the reservoir enter the tunnel voxel from the droplet system and transfer both latent and sensible heat into the voxel air. The amount of sensible and latent heat transferred by the droplet system is calculated using the relations given at the end of this section and depend upon the flow rate and temperature of the droplets and upon the tunnel air temperature and humidity. The temperature $T_{aT}$ of the tunnel voxel is incremented after each time step by $dT_{aT} = dQ_{Sen}/(V_T \rho_a C_{pa})$ where $dQ_{Sen}$ is the heat transferred by convection from the reservoir droplets to the voxel air during dt. The tunnel voxel mixing fraction is incremented by $dX_{aT} = -dM_r/(V_T \rho_a)$ where $-dM_r$ is the mass of water vapor transferred from the droplets to the voxel air during dt. $dQ_{Lat} = -H_v dM_r$ is the latent heat transferred to the tunnel voxel by the droplets during dt by evaporation ($dQ_{Lat}>0$) or by condensation ($dQ_{Lat}<0$).

At the end of the tunnel the latent heat $Q_{Lat}$ and sensible heat $Q_{Sen}$ accumulated in the tunnel voxel over the width of a 1 m wide lane of reservoir surface enters the heat exchanger tubes above this lane during the period dt so that the reservoir temperature decreases during $\Delta t$ by the amount:

$$\Delta T_r = -\left(\frac{\Delta t}{dt}\right)\frac{(Q_{Sen} + Q_{Lat})}{\Delta Z_1 W d_r \rho_w C_{pw}} \quad (4)$$

Within the heat exchanger tube the simulation follows a cylindrical lamina of air or tube voxel with volume $V=\pi D_0^2 \Delta L/4$ where $\Delta L=1.5$ cm is the length of the tube voxel. Each time step for the heat exchanger tube simulation has the duration $dt=\Delta L/v_x \ll \Delta t$. Heat is conducted through the sides of the tube to the outside air; this heat transfer must also account for water condensing within the tube voxel as the air temperature drops.

We first calculate the total heat transfer coefficient $h_c$. This coefficient has 3 contributions which represent the sum of the resistances to the heat flow out of the tube[4]:

$$\frac{1}{D_0 h_c} = \frac{1}{D_0 h_0} + \frac{\log(D_1/D_0)}{2k_{01}} + \frac{1}{D_1 h_1} \quad (5)$$

The first term accounts for the heat transfer across the boundary layer of the air stream flowing within the tube with heat transfer coefficient $h_0$. The second term accounts for the thermal conductivity $k_{01}$ through the wall of the tube. The third term accounts for the heat transfer across the boundary layer of the outside air stream flowing past the tube bank with heat transfer coefficient $h_1$.

For the heat transfer within the tube, $h_0=Nu_0 D_0/k_a$ where $k_a$ is the thermal conductivity for air and $Nu_0$ is the Nusselt number. The Reynolds number is given by $Re_0=D_0 v_x \rho_a/\mu_a$ where $\mu_a$ is the viscosity of air. For $Re_0>2300$ the flow of air through the tube is turbulent; the airflow is generally turbulent for the conditions of the simulation. For turbulent or laminar flow $Nu_0$ is given in terms of $Re_0$ and the Prandtl number $Pr=C_{pa}\mu_a/k_a$ by the following expressions[5]:

$$Nu_0 = 0.023 \, Re_0^{0.8} Pr^{0.33} \quad \text{(Turbulent)} \quad (6)$$

$$Nu_0 = 3.65 + \frac{0.65 \, Re_0 \, Pr D_0/L}{1 + 0.04(Re_0 Pr D_0/L)} \quad \text{(Laminar)}$$

Note that the temperature loss through the tube for turbulent flow is only a weak function of velocity: although the residence time of air within a section of length $\Delta L$ is $dt=\Delta L/v_x$ the heat transfer coefficient is proportional to $v_x^{0.8}$.

The thermal conductivity $k_{01}$ through the tube wall was discussed earlier. The Nusselt number $Nu_1$ for the cross flow of outside air past the tube is given by[5]:

$$Nu_1 = Nu_1^{(Lam)}\left[1 + \left(\frac{Re_1}{282000}\right)^{5/8}\right]^{0.8} \quad \text{(Turbulent)} \quad (7)$$

$$Nu_1^{(Lam)} = 0.3 + \frac{0.62 \, Re_1^{1/2} Pr^{1/3}}{[1 + (0.4/Pr)^{2/3}]^{1/4}} \quad \text{(Laminar)}$$

where $Re_1=D_h v_1 \rho_a/\mu_a$ and $v_1$ is the velocity of the outside air within the tube bank. The heat transfer coefficient for the outside airflow is $h_1=Nu_1 D_1/k_a$. The airflow is turbulent for $Re_1>10,000$; the flow is generally turbulent for the model.

When the heat $\Delta Q_w$ is transferred out of the tube voxel air through the walls of the tube during dt the temperature drops and water condenses, releasing sensible heat $\Delta Q_m$ back into the tube voxel air. The magnitude of the temperature drop $\Delta T$ of the tube voxel air during the time dt must account for both sources of heat:

$$\rho_a C_{pa} V_x \Delta T = \Delta Q_w - \Delta Q_m \quad (8)$$

In Eq. 8 the quantities $\Delta T$, $\Delta Q_w$, and $\Delta Q_m$ are positive magnitudes. If $T_o$ is the outside temperature and T, X are the temperature and mixing fraction of the tube voxel air, then:

$$\Delta Q_w = h_c A(T - T_o) dt \quad (9)$$

$$\Delta Q_m = V_x \rho_a H_v \Delta T \frac{dX}{dT}$$

where the voxel is exposed to the tube wall area $A=\pi D_0 \Delta L$. Eqs. (8) and (9) may be solved for $\Delta T$:

$$\Delta T = \frac{4h_c(T - T_o)dt}{\rho_a D_0\left(C_{pa} + H_v \dfrac{dX}{dT}\right)} \quad (10)$$

In the simulation the derivative dX/dT is set to zero if the relative humidity is less than 99.9% because there is no condensation. Otherwise dX/dT is calculated from the vapor pressure for saturated air. It may be shown (starting from Eq. 22) that:

$$\frac{dX}{dT} = X\frac{dP_w}{dT}\frac{P_{a1}}{P_w(P_{a1} - P_w)} \quad (11)$$

where $P_{a1}$ is the pressure at 1 atm and $P_w$ is the vapor pressure of saturated air at the tube voxel temperature. For $10°$ C.$<T<40°$ C. the saturated vapor pressure is given by the following cubic polynomial where $P_w$ is in Pascals:

$$P_w(T)=480.2+71.09T-0.352T^2+0.0722T^3 \quad (12)$$

Eq. (12) also yields the derivative $dP_w/dT$ for Eq. (11).

The pressure drop through a tube of length L for turbulent flow is given by[4]:

$$\Delta P = \frac{2f\rho_a v_x^2 L}{D_0} \quad (13)$$

where the friction factor f is given approximately by the Blasius formula[4]: $f=0.791/Re_0^{1/4}$. Once the pressure drop is known the power requirement for vanaxial fans to pull the air through the heat exchanger bank may be calculated from[6]:

$$\text{Power[Watts]} = \frac{\Delta P[\text{Pa}] \times \text{Airflow}[\text{m}^3 \text{s}^{-1}]}{\text{Efficiency}=0.81} \quad (14)$$

Outside fans above the heat exchanger pull air upwards through the tube bank at an average "empty" velocity $v_e$: the velocity of the air before entering the tube bank. If the average change in temperature of the air after crossing the tube bundle is $\Delta T_{TB}$ then heat is removed from the tube bank by the cross flow of outside air at the rate $v_e L \Delta Z_1 \rho_a C_{pa} \Delta T_{TB}$ per meter of tube bank width. Equating this loss to the rate of loss of reservoir heat to the tunnel air per meter of greenhouse length yields the rise in outside air temperature as the air crosses the tube bank:

$$\Delta T_{TB} = \frac{\delta Q_r / \Delta t}{v_e L \Delta Z_1 \rho_a C_{pa}} \quad (15)$$

where $\delta Q_r/\Delta t$ is the rate of reservoir heat loss for a 1 m wide lane of reservoir surface. This temperature change is 0.7° C. or less during the 24 hour cycle. When the heat transfer is calculated in the simulation from a single tube the outside temperature $T_o$ is increased by half a degree at the surface of the tube to account approximately for the average rise in air temperature as the outside air flows past the tube bundle: this is the effective $T_o$ used in Eqs. (9) and (10).

The heat exchanger tube bank design was described earlier with definitions for the pitch a along $\hat{z}$ and the pitch b along $\hat{y}$. The pressure drop across the tube bank is given by Martin and Gnielinski[7]:

$$\Delta P = \frac{1}{2} \xi N_R \rho_a v_1^2 \quad (16)$$

where $N_R$ is the number of tube rows, $v_1 = v_e a/(a-1)$ is the air velocity in the narrowest cross section, and $\xi$ is a dimensionless constant that depends upon a and b. The Reynolds number $Re_1$ for this geometry is calculated from the velocity $v_1$ and the outer tube diameter $D_1$. The constant $\xi$ is given by[7]:

$$\xi = \frac{280\pi[(\sqrt{b} - 0.6)^2 + 0.75]}{a^{1.6}(4ab - \pi)Re_1} \quad (17)$$

In the simulation the outside empty velocity and the inner tube velocity are chosen to be equal ($v_e = v_x$). The power requirements for maintaining the airflow through the heat exchanger tube bundle and for maintaining the outside airflow across the bundle are calculated from Eqs. 13, 14, 16 and 17. The power required to pump the water to maintain the reservoir flow is given by[8]:

$$\text{Power[Watts]} = \frac{\text{Water Flow[kg s}^{-1}] \times 9.8 \text{ m s}^{-2} \times \text{h[m]}}{\text{Efficiency} = 0.70} \quad (18)$$

The energy cost to operate the greenhouse over a 24-hour cycle is 2.32 MWh per cultivated hectare: 0.92 MWh to operate the pumps to maintain the reservoir flow and 1.40 MWh to operate the fans inside and outside of the greenhouse to discharge the reservoir heat and dehumidify the air. If 20% efficient solar panels coupled with battery storage are deployed to shade part of the reservoirs by covering 10% of the total roof area, then the panels will provide enough electrical power to operate the greenhouse cooling system under the insolation conditions assumed in the model so that the greenhouses may be deployed off the grid.

This discussion ends with a calculation of the heat and mass transfer between the air and a single falling droplet of water. This calculation is one of the foundations for the theoretical model and simulation of the cooling system. The droplet is assumed to be spherical with diameter D and uniform temperature $T_w$ (well-mixed); it is falling with velocity v. In general the droplet is not at terminal velocity so that a numerical integration of the heat and mass transfer is required over the time that the droplet is in the air. The air is at temperature $T_a$ with a mixing fraction $X_a$. At the surface of the droplet the air is saturated (relative humidity RH=100%) with mixing fraction $X_s$. The fluid properties for the air surrounding the droplet that are used to calculate the dimensionless variables are calculated at the average temperature $T_f = (T_a + T_w)/2$.

The convective heat transfer to the droplet is given by:

$$\frac{dq_c}{dt} = -\pi D^2 h_c (T_w - T_a) \quad (19)$$

where $h_c$ is the convective heat transfer coefficient for the droplet (J s$^{-1}$ cm$^{-2\circ}$ C.$^{-1}$). The heat transfer coefficient for a falling spherical droplet is obtained from[4]:

$$\frac{h_c D}{k_f} = 2.0 + 0.60 \left(\frac{D v \rho_f}{\mu_f}\right)^{1/2} \left(\frac{C_{pf} \mu_f}{k_f}\right)^{1/3} \quad (20)$$

This equation may be written to express the dimensionless number definitions for the Nusselt number Nu, Reynolds number Re, and Prandtl number Pr as Nu=0.2+0.6 Re$^{1/2}$ Pr$^{1/3}$.

The signed mass transfer to the droplet, due to condensation or evaporation, is given by:

$$\frac{dm}{dt} = -\pi D^2 h_m (X_s - X_a) \quad (21)$$

where $h_m$ is the mass transfer coefficient (g s$^{-1}$ cm$^{-2}$). The mixing fraction $X_s$ at the surface of the droplet may be expressed in terms of the vapor pressure of water in saturated air at the temperature of the droplet:

$$X_s = \frac{M_w P_w}{M_a (P_{a1} - P_w)} \quad (22)$$

where $M_a$ is the gram molecular weight of air, $M_w$ is the gram molecular weight of water, $P_{a1}$ is the air pressure at one atmosphere, and $P_w$ is the vapor pressure of water in saturated air at the temperature of the droplet.

The mass transfer coefficient is obtained from a relation similar in form to Eq. (20)[4]:

$$\frac{h_m D}{\rho_f \Lambda_{aw}} = 2.0 + 0.60 \left(\frac{D v \rho_f}{\mu_f}\right)^{1/2} \left(\frac{\mu_f}{\rho_f \Lambda_{aw}}\right)^{1/3} \quad (23)$$

where $\Lambda_{aw}$ (cm$^2$ s$^{-1}$) is the binary mass transfer coefficient between air and water. $\Lambda_{aw}$ is strongly temperature dependent and calculated from[4]:

$$\frac{p\Lambda_{aw}}{(p_{ca}p_{cw})^{1/3}(T_{ca}T_{cw})^{5/12}\left(\frac{1}{M_a}+\frac{1}{M_w}\right)} = 3.640 \times 10^{-4}\left(\frac{T}{\sqrt{T_{ca}T_{cw}}}\right)^{2.334} \quad (24)$$

where p is the pressure (atm), T is the temperature in Kelvin, $p_{ca}$ and $p_{cw}$ are the critical pressures for air and water, and where $T_{ca}$ and $T_{cw}$ are the critical temperatures for air and water.

When the droplet exchanges mass with the air in Eq. 21 it exchanges latent heat: the droplet cools or heats and the surrounding air gains or loses humidity. For the case of convective heating in Eq. 19 the droplet exchanges sensible heat and the surrounding air changes temperature. Neglecting radiative heat loss, which is on the order of one percent of the heat transfer from Eqs. 19 and 21, the rate of change of the droplet temperature is:

$$\frac{\pi D^3}{6}\rho_w C_{pw}\frac{dT_w}{dt} = -\pi D^2[h_c(T_w - T_a) + H_v h_m(X_s - X_a)] \quad (25)$$

Both the heat and the mass transfer coefficients depend upon the Reynolds number, which in turn depends upon the velocity of the droplet. The falling droplet accelerates due to the net force of gravity and drag against the air. The equation of motion is:

$$m\frac{dv(t)}{dt} = mg - \frac{1}{8}\pi D^2 \rho_a C v(t)^2 \quad (26)$$

where C is the dimensionless drag coefficient. These coefficients have been tabulated for different drop diameters[9]; for a 1 mm diameter droplet C=0.67. At terminal velocity $v(\infty)$ the acceleration is zero and we obtain:

$$v(\infty) = \sqrt{\frac{4Dg\rho_w}{3C\rho_a}} \quad (27)$$

For a 1 mm droplet the terminal velocity is 403 cm/s corresponding to Re=269. The product $Pr^{2/3} Re=214<5\times10^4$ so that Eq. 20 remains valid at all times.[4] In general Eq. 26 must be integrated numerically in small time steps dt. To compute the droplet velocity for each time step we may use the following explicit integration:

$$v(t+dt) = v(t) + \left[1 - \left(\frac{v(t)}{v(\infty)}\right)^2\right]g\,dt \quad (28)$$

In conclusion, this invention describes a method and apparatus to convectively cool an unventilated greenhouse while conserving substantially all of the water, potentially extending agriculture into regions where fresh water and arable land are scarce and providing a means to sequester $CO_2$ into biomass without displacing farmland or regions of high biodiversity. The invention uses the low ambient temperature during the late night and morning to minimize the energy requirement for the cooling system. While the invention has been described with reference to some specific embodiments, it will be understood by those skilled in the art that changes may be made and equivalents may be substituted while remaining within the scope of the invention. Therefore it is intended that the invention not be limited to the particular embodiments discussed, but that the invention will include any embodiment falling within the scope of the appended claims.

The invention claimed is:

1. An apparatus for transferring heat between a building and the outside air, the apparatus comprising:
   a. at least one reservoir of water, disposed within the building or within an associated structure that freely exchanges its air with the air of said building;
   b. at least one droplet dispenser above the at least one reservoir, wherein heat is exchanged between the air above the reservoir and reservoir water that is circulated to the droplet dispenser;
   c. at least one air-to-air heat exchanger in contact with the air outside of the building;
   d. a structure enclosing the surface of the at least one reservoir and the at least one droplet dispenser denoted as a tunnel, thereby providing a restricted volume of air above the at least one reservoir that is isolated from the air in the remainder of the building, wherein heat and humidity transferred between the restricted volume of air and the reservoir by the droplet dispenser remains confined to the tunnel and reservoir and not dispersed to the air in the remainder of the building;
   e. a means to open or close the sides of the tunnel, thereby controlling the free exchange of air between the tunnel volume and the remainder of the building;
   f. and a means to open or close the ends of the tunnel, thereby controlling the free exchange of air between the tunnel volume and the at least one heat exchanger.

2. The apparatus of claim 1, wherein building air is circulated through the air-to-air heat exchanger while the tunnel is opened to exchange air freely with the air in the remainder of the building, whereby the humidity of the building air may be reduced by condensing water vapor within the heat exchanger.

3. The means to open or close the sides of the tunnel of claim 1, wherein the sides of the tunnel enclosure are comprised of louvered sections that may be pivotally rotated to open or close the tunnel enclosure to the remainder of the building.

4. The means to open or close the ends of the tunnel of claim 1, wherein the ends of the tunnel enclosure are comprised of louvered sections that may be pivotally rotated to open or close the ends of the tunnel to an inlet or an outlet of the at least one air-to-air heat exchanger.

5. The droplet dispenser of claim 1, the droplet dispenser further comprising:
   a. at least one open region devoid of droplets surrounded by a region where droplets are released;
   b. and at least one fan, wherein the airflow generated by the at least one fan passes through the surrounding droplets and through the at least one open region devoid of droplets, whereby air may be efficiently circulated through a concentrated flow of droplets.

6. The droplet dispenser of claim 5, the droplet dispenser further including a means to float the droplet dispenser on the surface of the reservoir, whereby framing to support the droplet dispenser on the ground is avoided.

7. A method for transferring heat between the air outside of a building and a reservoir of water within said building, or any structure that shares air freely with said building, the method comprising:

a. circulating reservoir water to a droplet dispenser above the reservoir and dispensing droplets back to the reservoir within a restricted volume of air above the surface of the reservoir, thereby transferring heat between the reservoir water and said restricted volume of air above the surface of the reservoir;

b. and simultaneously circulating the air from said restricted volume above the reservoir through an air-to-air heat exchanger disposed outside of the building, thereby transferring heat between the air circulating in the heat exchanger and the ambient air outside the building.

8. The method of claim 7, wherein the building and any associated structures that share air freely with the building are unventilated, whereby water is conserved within the building and any associated structures that share air freely with the building.

9. The method of claim 7, wherein the air from the building entering the heat exchanger is returned by said heat exchanger to said building.

10. A plurality of buildings, each building using the method of claim 7, wherein the plurality of buildings is connected by a plurality of heat exchangers, such that an inlet port of a heat exchanger is in one building, and an outlet port of said heat exchanger is in another building, wherein the plurality of buildings includes a first building and a final building, such that the inlet port to a heat exchanger in the final building is connected by said heat exchanger to the outlet port of said heat exchanger in the first building, whereby the air may be freely exchanged between all of the buildings within the plurality of buildings, whereby air may be transmitted from building to building within the plurality of buildings through the plurality of heat exchangers to create a closed cycle of air flow in order to cool the reservoir water in each building within the plurality of buildings.

11. The method of claim 7, wherein the building is a greenhouse.

12. The greenhouse of claim 11, wherein the greenhouse is unventilated, and heat accumulated in the at least one reservoir during the day is discharged to the ambient air.

* * * * *